US011192729B2

(12) United States Patent
Kubiak et al.

(10) Patent No.: US 11,192,729 B2
(45) Date of Patent: Dec. 7, 2021

(54) SYSTEM AND APPARATUS FOR PRINT MEDIA MANUFACTURING BUFFERING AND SORTING, AND CORRESPONDING METHOD THEREOF

(71) Applicant: LIGHTNING SOURCE LLC, LaVergne, TN (US)

(72) Inventors: Peter Kubiak, Rosenheim (DE); Josef Martin Strasser, Staudach-Egerndach (DE)

(73) Assignee: Lightning Source LLC, LaVergne (TN)

( * ) Notice: Subject to any disclaimer, the term of this patent is extended or adjusted under 35 U.S.C. 154(b) by 0 days.

(21) Appl. No.: 17/130,581

(22) Filed: Dec. 22, 2020

(65) Prior Publication Data
US 2021/0107751 A1 Apr. 15, 2021

Related U.S. Application Data

(60) Continuation of application No. 16/511,983, filed on Jul. 15, 2019, now Pat. No. 10,870,546, which is a
(Continued)

(51) Int. Cl.
*B65G 61/00* (2006.01)
*B07C 3/18* (2006.01)
(Continued)

(52) U.S. Cl.
CPC ............... *B65G 61/00* (2013.01); *B07C 3/00* (2013.01); *B07C 3/18* (2013.01); *B41J 11/58* (2013.01);
(Continued)

(58) Field of Classification Search
CPC ...... B65H 29/02; B65H 29/003; B65G 61/00; B07C 3/00; B07C 3/18
(Continued)

(56) References Cited

U.S. PATENT DOCUMENTS 4,316,693 A * 2/1982 Baxter ................... B65G 57/22
198/468.3
5,174,454 A * 12/1992 Parkander ............ B65G 1/0407
209/3.3
(Continued)

FOREIGN PATENT DOCUMENTS

CA 2974039 A1 7/2016
JP 07-187316 A 7/1995

OTHER PUBLICATIONS

European Patent Office extended search report of corresponding application No. 18/853,240, dated Jul. 30, 2021, 9 pages.
(Continued)

*Primary Examiner* — Leslie A Nicholson, III
(74) *Attorney, Agent, or Firm* — Patterson Intellectual Property Law, P.C.; Edward D. Lanquist, Jr.; Grant M. Ford

(57) ABSTRACT

Apparatuses, systems, and methods are described for providing a multiple process workflow. The system includes a first process device configured to convey at least a portion of a printed element and an apparatus. The apparatus includes a storage section, an input section configured to receive the at least a portion of the printed element, a gripper configured to selectively transport the at least a portion of the printed element from the input section to the storage section and to selectively transport the at least a portion of the printed element from the storage section, and an output section configured to selectively transfer the at least a portion of the printed element from the storage section. The system further includes a second process device configured to perform at least one operation on the at least a portion of the printed element.

17 Claims, 14 Drawing Sheets

Related U.S. Application Data continuation of application No. 16/036,407, filed on Jul. 16, 2018, now Pat. No. 10,351,360, which is a division of application No. 15/701,046, filed on Sep. 11, 2017, now Pat. No. 10,246,277.

(51) Int. Cl.

| | | |
|---|---|---|
| *B65H 29/02* | (2006.01) | |
| *B65H 29/00* | (2006.01) | |
| *B07C 3/00* | (2006.01) | |
| *B65H 31/30* | (2006.01) | |
| *B65G 1/04* | (2006.01) | |
| *B65H 5/00* | (2006.01) | |
| *B65H 31/24* | (2006.01) | |
| *B42C 19/02* | (2006.01) | |
| *B65H 39/02* | (2006.01) | |
| *B41J 11/58* | (2006.01) | |

(52) U.S. Cl.
CPC .......... *B42C 19/02* (2013.01); *B65G 1/0407* (2013.01); *B65H 5/006* (2013.01); *B65H 29/003* (2013.01); *B65H 29/02* (2013.01); *B65H 31/24* (2013.01); *B65H 31/3045* (2013.01); *B65H 39/02* (2013.01); *B65H 2701/182* (2013.01); *B65H 2801/48* (2013.01)

(58) Field of Classification Search
USPC ........................................ 700/222, 223, 224
See application file for complete search history.

(56) References Cited

U.S. PATENT DOCUMENTS

| | | | | |
|---|---|---|---|---|
| 5,178,506 | A | * | 1/1993 | Meschi ................ B65G 1/0407 414/268 |
| 5,727,919 | A | * | 3/1998 | Heumann .............. B65G 61/00 414/268 |
| 5,857,830 | A | | 1/1999 | Harres et al. |
| 6,567,722 | B1 | * | 5/2003 | Menke ................... G07D 11/12 700/223 |
| 6,579,053 | B1 | * | 6/2003 | Grams ..................... B25J 15/10 198/348 |
| 7,220,093 | B2 | * | 5/2007 | Overman ................... B07C 3/00 271/103 |
| 2004/0181308 | A1 | * | 9/2004 | Hayashi ................. B65H 31/24 700/223 |
| 2005/0105992 | A1 | * | 5/2005 | An ....................... H01L 21/6734 414/280 |
| 2016/0001992 | A1 | * | 1/2016 | Takao .................. B65G 63/004 414/788.4 |
| 2016/0207710 | A1 | * | 7/2016 | Conrad ................ B65G 1/0492 |

OTHER PUBLICATIONS

International Search Report and Written Opinion of corresponding International Patent Application No. PCT/US2018/050218 dated Dec. 26, 2018, 18 pages.

* cited by examiner ly, the present invention relates to providing a decen-

SYSTEM AND APPARATUS FOR PRINT MEDIA MANUFACTURING BUFFERING AND SORTING, AND CORRESPONDING METHOD THEREOF

CROSS-REFERENCES TO RELATED APPLICATIONS

This application is a continuation of U.S. patent application Ser. No. 16/511,983 filed Jul. 15, 2019, entitled "System and Apparatus for Print Media Manufacturing Buffering and Sorting, and Corresponding Method Thereof," which is a continuation of U.S. patent application Ser. No. 16/036,407 filed Jul. 16, 2018, entitled "System and Apparatus for Print Media Manufacturing Buffering and Sorting, and Corresponding Method Thereof" (now issued as U.S. Pat. No. 10,351,360 on Jul. 16, 2019), which is a divisional application of U.S. patent application Ser. No. 15/701,046 filed Sep. 11, 2017, entitled "System and Apparatus for Print Media Manufacturing Buffering and Sorting, and Corresponding Method Thereof" (now issued as U.S. Pat. No. 10,246,277 on Apr. 2, 2019), each of which is hereby incorporated by reference in its entirety.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to systems and method for providing a print media manufacturing buffering and sorting and corresponding methods thereof. More particularly, the present invention relates to providing a decentralized multi-process print media manufacturing system, apparatus, and method providing routing capabilities to route in-process units to available processes.

Existing systems suffer numerous process delays and drawbacks. For example, in various systems, a transport station is a central element of the production system, but is only capable of providing a static configuration. In such a system, all products enter the transport station at a fixed location, providing a rigid and inefficient process flow.

In existing zone-based manufacturing and assembly processes, if a product is delivered into particular zone in error due to misplaced product covers by an operator, robots of different zones must typically move out of their respective zone(s). Only then may a robot of the particular zone obtain the product and transport the product for processing. These deficiencies result in lost production and increased process complexity.

Although misplaced covers are no longer a concern some existing systems (e.g., because of automated cover distribution configured to provide covers to various processes), control can still cause robots to move out of their respective zone depending on distances between pick-up and drop-off locations. As such, cross-feed issues still occur and cause losses in productivity in the system 400.

BRIEF SUMMARY OF THE INVENTION

One aspect of the present disclosure relates to a system for providing a multiple process workflow. The system includes a first process device configured to convey at least a portion of a printed element and an apparatus. The apparatus includes a storage section, an input section configured to receive the at least a portion of the printed element, a gripper configured to selectively transport the at least a portion of the printed element from the input section to the storage section and to selectively transport the at least a portion of the printed element from the storage section, and an output section configured to selectively transfer the at least a portion of the printed element from the storage section. The system further includes a second process device configured to perform at least one operation on the at least a portion of the printed element.

The first process device may perform at least one of a printing operation, a sorting operation, a collating operation, a jogging operation, a book covering operation, or a page combining operation.

The second process device may perform at least one of a printing operation, a sorting operation, a collating operation, a jogging operation, a book covering operation, or a page combining operation.

The storage section of the apparatus may include at least one segment having a plurality of ridges and valleys, the segment configured to store thereupon the at least a portion of the printed element.

The input section may include a visual indicia detector configured to identify at least one property associated with the at least a portion of the printed element.

The apparatus further may further include a second gripper, the second gripper associated with at least one of the input section and the output section, the second gripper configured to perform at least one of: selectively transporting the at least a portion of the printed element from the input section to the storage section, selectively transporting the at least a portion of the printed element from the storage section, and selectively transporting the at least a portion of the printed element to the output section.

The gripper and the second gripper may cooperatively operate to perform at least one of buffering and sorting.

The gripper may perform operations associated with the at least a portion of the printed element relating to the input section, and wherein the second gripper is configured to perform operations associated with the at least a portion of the printed element in relation to the output section.

The apparatus may further include a processor configured to control at least one operation of the apparatus.

The processor may cause the gripper to selectively transport a media portion received at the input section to the storage section upon receipt of the media portion, and to selectively cause the gripper to transport the media portion to the output section based at least in part upon a control signal received at the processor.

A further aspect of the present disclosure relates to a system for performing at least one of buffering or sorting a printed element. The system includes a first process device configured to convey at least a portion of a printed element and an apparatus. The apparatus includes a storage section including at least one segment having a plurality of ridges and valleys, the at least one segment configured to store the at least a portion of the printed element and a gripper configured to selectively transport the at least portion of the printed element to and from the storage section. The system further includes an output section configured to selectively output the at least portion of the printed element and a second process device configured to perform at least one operation in association with the at least a portion of the printed element.

The first process device may perform at least one of a printing operation, a sorting operation, a collating operation, a jogging operation, a book covering operation, or a page combining operation.

The second process device may perform at least one of a printing operation, a sorting operation, a collating operation, a jogging operation, a book covering operation, or a page combining operation.

The storage section may includes a first storage portion and a second storage portion, each of the first storage portion and the second storage portion having a respective plurality of ridges and a respective plurality of valleys formed therein, the plurality of ridges and the plurality of valleys configured to form at least one cavity, wherein the plurality of ridges of the first storage portion and the second storage portion, and the plurality of valleys of the first storage portion and the second storage portion are configured such that at least a portion of the at least one gripper is received in the at least one cavity.

A still further aspect of the present disclosure relates to a system for performing at least one of buffering or sorting a printed element. The system includes a first process device configured to convey at least a portion of a printed element and a storage section. The storage section includes at least one gripper, a plurality of ridges and a plurality of valleys configured to form at least one cavity, wherein the plurality of ridges and the plurality of valleys are configured such that at least a portion of the at least one gripper is received in the at least one cavity, and an output section configured to selectively output the at least portion of the printed element. The system further includes a second process device having a second operation configuration, the second process device configured to perform at least one operation in association with the at least a portion of the printed element.

The first process device may perform at least one of a printing operation, a sorting operation, a collating operation, a jogging operation, a book covering operation, or a page combining operation.

The second process device may perform at least one of a printing operation, a sorting operation, a collating operation, a jogging operation, a book covering operation, or a page combining operation.

Numerous other objects, features, and advantages of the present invention will be readily apparent to those skilled in the art upon a reading of the following disclosure when taken in conjunction with the accompanying drawings

DETAILED DESCRIPTION OF THE INVENTION

Figure 1:
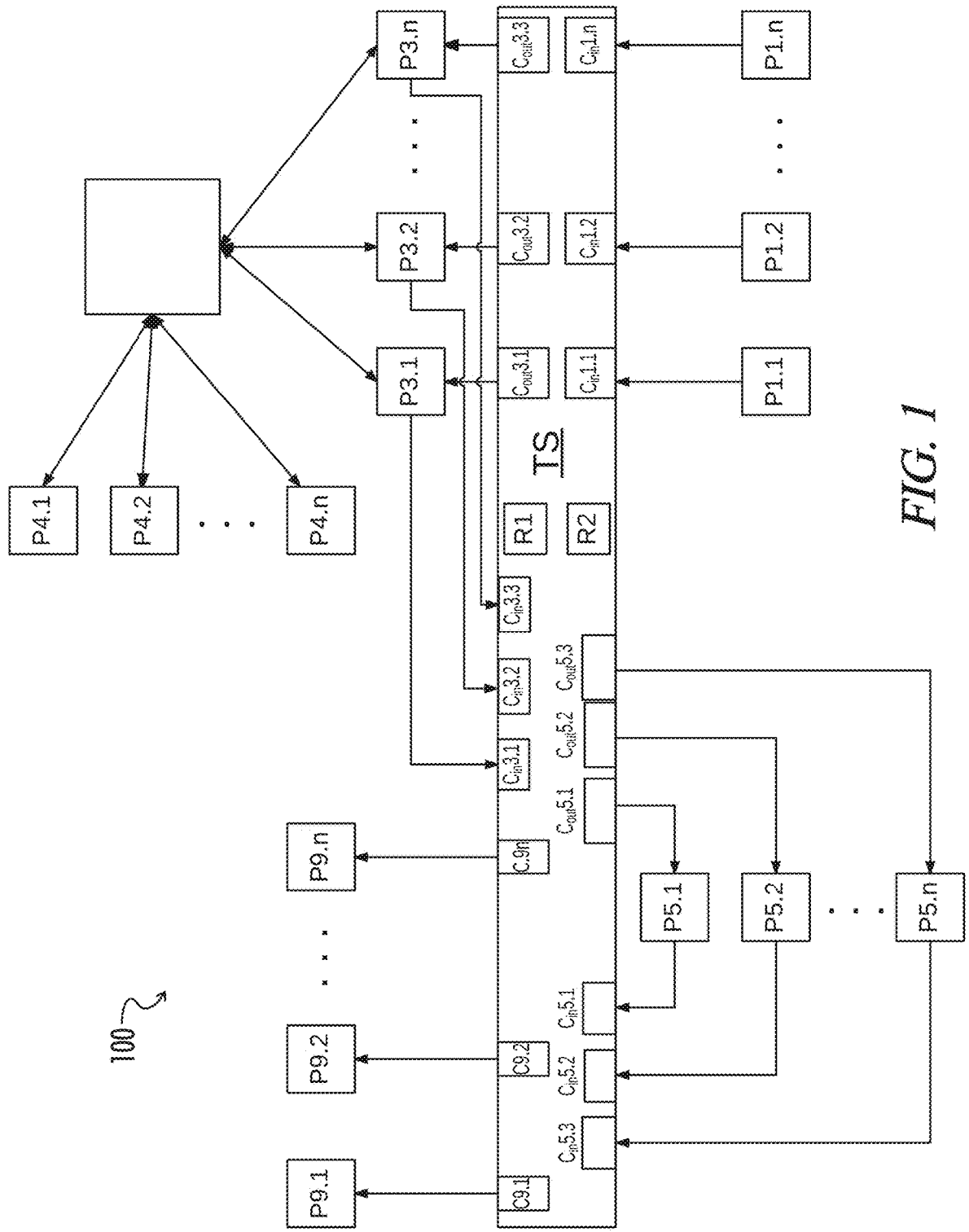
FIG. 1 illustrates an existing printed product production system.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

Referring generally to FIGS. 1-14, exemplary systems, apparatuses, and methods for providing print media assembly, buffering, and sorting are illustrated in greater detail. Where the various figures may describe embodiments sharing various common elements and features with other embodiments, similar elements and features are given the same reference numerals and redundant description thereof may be omitted below.

FIG. 1 illustrates an existing printed product production system 100. The system illustrated in FIG. 1 implements four separate processes to produce a printed product. The system begins at a process P1, where an operation corresponding to the first process P1 is implemented on at least a portion of an input product. The process P1 may be implemented in whole or in part by one or more process systems P1.1, P1.2, . . . , P1.n. The output from each of the processes P1.1-P1.n is received at a transport station TS. Each of the products entering the transport station TS arrive at a fixed location for each of the process systems P1.1, P1.2, . . . , P1.n. One or more robots may be implemented at the transport station TS to move at least a portion of the product between processes. For example, at least a portion of a product generated by the process P1.1 is received at a compartment $C_{in}1.1$, at least a portion of a product generated by the process P1.2 is received at a compartment $C_{in}1.2$, at least a portion of a product generated by the process P1.n is received at a compartment $C_{in}1.n$, etc.

The transport station TS includes two or more robots (e.g., robots R1/R2) to transfer products between compartments and processes during operation. For example, the one or more robots may transfer at least a portion of the product generated by the first processes P1.1, P1.2, . . . , P1.n from the compartments $C_{in}1.1, C_{in}1.2, \ldots, C_{in}1.n$ to one or more corresponding process 3 compartments $C_{out}3.1, C_{out}3.2, \ldots, C_{out}3.n$. The product received in the compartments $C_{out}3.1, C_{out}3.2, \ldots, C_{out}3.n$ may be processed by the corresponding process P3.1, P3.2, . . . , P3.n. Once processed by the process P3, at least a portion of the processed product may be transferred to a transport mechanism TM. The transport mechanism TM may be a conveyor configured to transport at least a portion of a product from the process P3 to a process P4.

The process P4 includes a plurality of process systems P4.1, P4.2, . . . , P4.n. The transport mechanism TM is configured to provide at least a portion of the product operated upon by the process P3 to the process P4, where at least one of the process systems P4.1, P4.2, . . . , P4.n is configured to perform one or more operations on or corresponding to the at least a portion of the product operated upon by the process P3. Once the operations corresponding to the process P4 are completed, the product is transported back to the transport station TS via the transport mechanism TM and at least one of the process systems P3.1, P3.2, . . . , P3.n. The product is placed into one or more of the compartments $C_{in}3.1, C_{in}3.2, \ldots C_{in}3.n$ designated for the process P3, and is then transferred to a process P5 via the robots of the transport system TS (i.e., via process P5 input compartments $C_{out}5.1, C_{out}5.2, C_{out}5.n$).

Once received at the process P5, one or more operations is performed on at least a portion of the product by at least one of the process systems P5.1, P5.2, . . . , P5.n. The processed at least a portion of product is then transported to the transport station TS via at least one of the process P5 output compartments $C_{in}5.1, C_{in}5.2, \ldots, Cin5.n$. The robots of the transport station TS then transport the product from the process P5 output compartments to at least one process P9 compartment C9.1, C9.2, . . . , C9.n. The process systems P9.1, P9.2, . . . , P9.n then perform at least one operation upon the product received at the compartments C9.1, C9.2, . . . , C9.n. A production process may conclude at the process P9, for example, where the process P9 is a book covering process or a distribution processing station.

The system illustrated by FIG. 1 provides that all possible cross-feeds are managed by the robots of the transport station TS and permits both printed product manufacturing and distribution in a single system. However, the system illustrated by FIG. 1 suffers numerous process delays and drawbacks. For example, the transport station TS is a central element of the production system but provides a static configuration. For example, all products enter the transport station TS at a fixed location.

Figure 2:
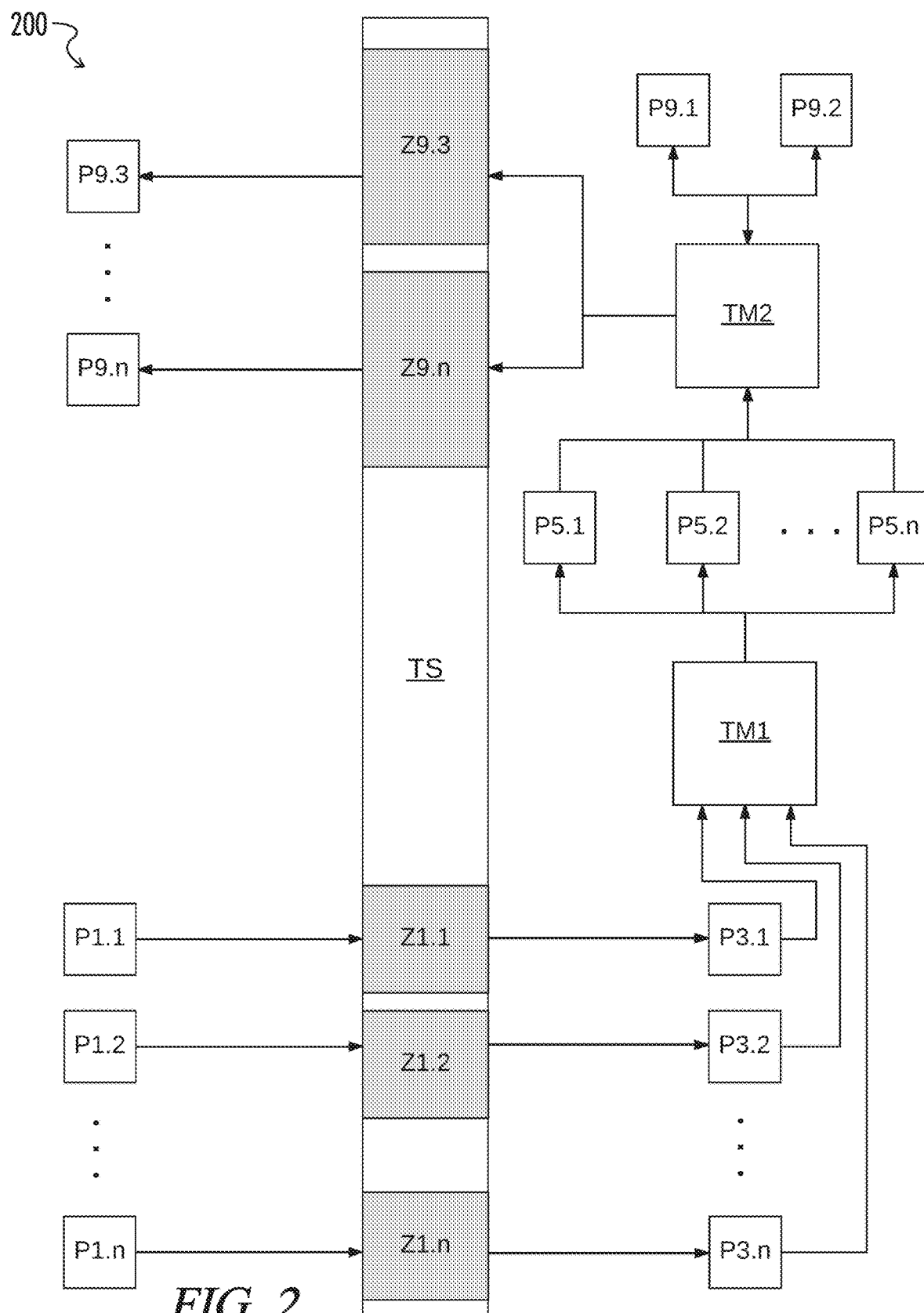
FIG. 2 illustrates a second existing production system.

FIG. 2 illustrates a second existing production system 200. Like the system 100 of FIG. 1, the system 200 begins at a first process P1, where at least one operation corresponding to the first process P1 is implemented on at least a portion of an input product. The process P1 may be implemented in whole or in part by one or more process systems P1.1, P1.2, . . . , P1.n. The output from each of the process systems P1.1-P1.n is received at a corresponding zone of a transport station TS. Each zone of the transport station TS has at least two corresponding robots configured to transport at least a portion of the product between processes. One or more zones associated with the process P1 correspond to process P3 (e.g., via process systems P3.1, P3.2, . . . , P3.n). Once the product is received at the process P3, one or more operations are performed on at least a portion of the product by one or more of the process systems P3.1, P3.2, . . . , P3.n, after which the product is transported to the transfer mechanism TM1. The transport mechanism TM2 transports the product from the process P3 to the process P5 (e.g., via conveyor).

The product is received by one or more of the process systems P5.1, P5.2, . . . , P5.n, at least one of which performs at least one operation on at least a portion of the product. After the at least one operation is performed, the product is output from the process P5 to a transport mechanism TM2. The transport mechanism TM2 conveys the product output from the process P5 to at least one of the process systems P9.1 and P9.2, and to the transport system TS (e.g., via the zones Z9.3, Z9.n). A production process may conclude at the process P9, for example, where the process P9 is a book covering process or a distribution processing station.

Figure 3:
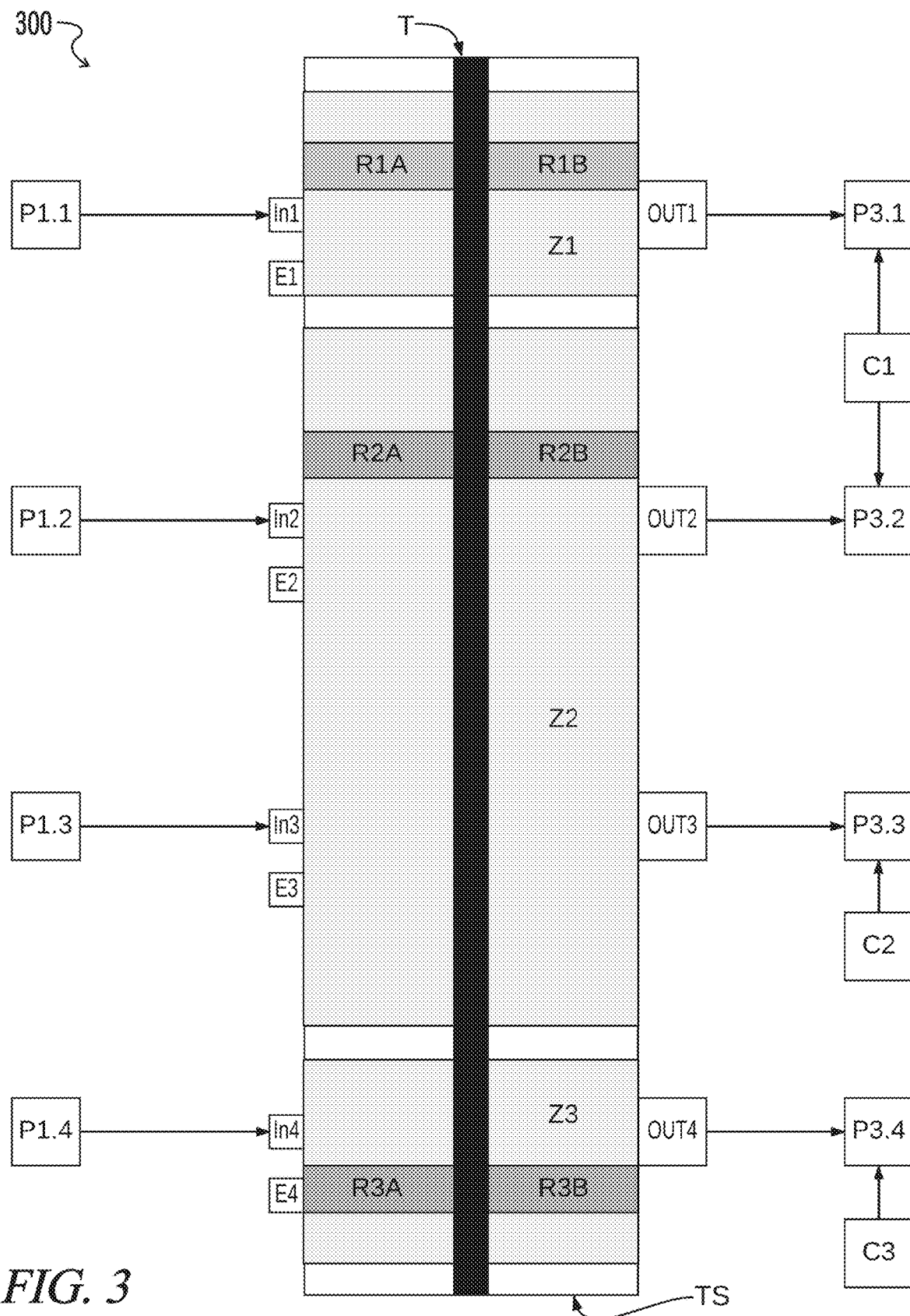
FIG. 3 provides a more detailed illustration of the relationship and operations between processes provided in FIG. 2.

FIG. 3 provides a more detailed illustration of the relationship and operations between the processes P1 and P3 as provided in FIG. 2. The system 300 includes four process systems P1.1, P1.2, P1.3, and P1.4 for the process P1. Each of the process systems P1.1, P1.2, P1.3, and P1.4 is configured to provide at least a portion of a printed product to a corresponding input mechanism In1, In2, In3, and In4, respectively. Each of the input mechanisms In1, In2, In3, and In4 is designed to convey the at least a portion of product processed by at least one of the process systems P1.1, P1.2, P1.3, and P1.4 to the transport system TS. As described with reference to FIG. 2, each zone (e.g., zones Z1, Z2, and Z3 of FIG. 3) may be associated with one or more of the process systems P1.1, P1.2, P1.3, and/or P1.4. Each zone may further include an error output (e.g., E1-E4) configured to output one or more products or portions of product determined to be improper or otherwise in error.

Each zone of the transport system TS of FIG. 3 includes an input side robot and an output side robot respectively configured to transport at least a portion of product received at the input side and at least a portion of product received at the output side. For example, the zone Z1 of FIG. 3 includes an input side robot R1A and an output side robot R1B, the zone Z2 includes an input side robot R2A and an output side robot R2B, and the zone Z3 includes an input side robot R3A and an output side robot R3B. The robots of FIG. 3 are each coupled to a track T configured to permit the robots to move in a longitudinal direction of the transport system TS.

Each zone further includes at least one output section corresponding to the process P3. For example, in the system 300, the zone Z1 includes an output section OUT1 corresponding to the process system P3.1, two output sections OUT2 and OUT3 corresponding to the process systems P3.2 and P3.3, and an output section OUT4 corresponding to the process system P3.4. The output sections OUT1-OUT4 are configured to transport at least a portion of the product from the transport station TS to at least one of the process systems P3.1, P3.2, P3.3, and/or P3.4.

One or more of the process systems P3.1, P3.2, P3.3, and/or P3.4 may be coupled to a cover processor. For example, in the embodiment illustrated by FIG. 3, the process systems P3.1 and P3.2 are coupled to a cover processor C1, the process system P3.3 is coupled to a cover processor C2, and the process system P3.4 is coupled to a cover processor C3. Each of the cover processors C1-C3 may require an operator to manually place one or more product covers to be implemented in association with a process (e.g., process P3).

Despite providing a more robust implementation that than of FIG. 1, the systems of FIGS. 2 and 3 suffer processing drawbacks. For example, the process P1.1 can only deliver products to the zone Z1, the processes P1.2 and P1.3 can only deliver to zone Z2, and the process P1.4 can only deliver to the zone Z3. Furthermore, if a product delivered into zone Z3 is needed for the process system P3.1 due to misplaced product covers by an operator, a robot of the zone Z1 must move out of its zone, a robot of the zone Z2 must move out of its zone and completely out of zone Z1. Only then, may a robot of the zone Z3 obtain the product and transport the product for processing. These deficiencies result in lost production and increased process complexity.

Figure 4:
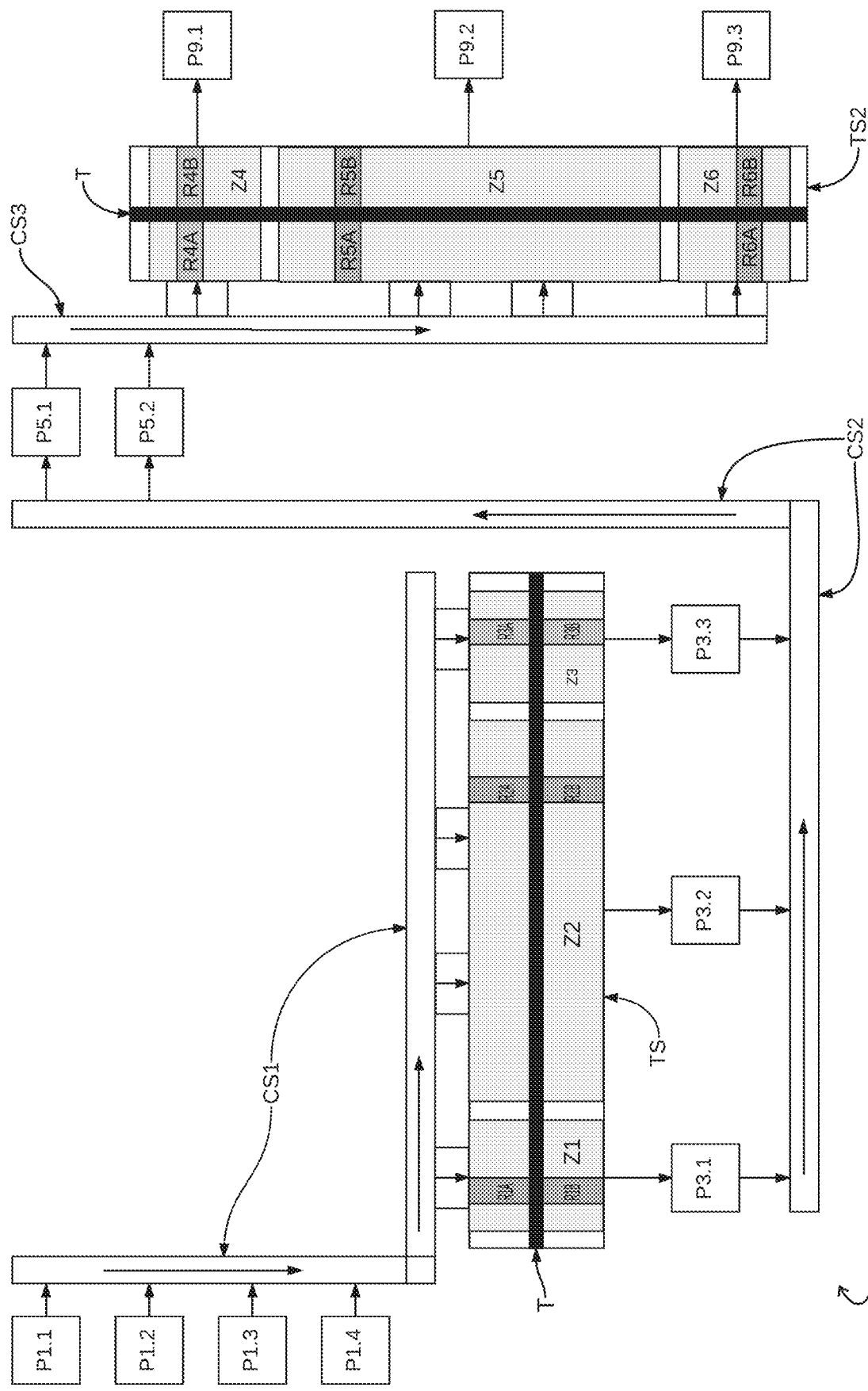
FIG. 4 illustrates a third existing implementation of a system for providing printed products.

FIG. 4 illustrates a third existing implementation of a system 400 for providing printed products. The system 400 of FIG. 4 includes four process systems P1.1, P1.2, P1.3, and P1.4 associated with a first process P1. The first process P1 may include at least one of the process systems P1.1, P1.2, P1.3, and/or P1.4 performing at least one operation associated with a product. The process P1 may output the printed product along a first conveyor system CS1 which transports the product to the transport system TS. The transport system TS is configured to convey the product from the first process P1 to the third process P3 as described above with reference to FIGS. 2 and 3. The third process P3 of FIG. 4 includes three process systems P3.1, P3.2, and P3.3. The third process P3 of FIG. 4 operates in the same manner as described above with reference to FIGS. 2 and 3. The output from at least one of the process systems P3.1, P3.2, and P3.3 is provided to a second conveyer system CS2.

The second conveyor system CS2 transports the product between the third process P3 and a fifth process P5. The fifth process P5 of FIG. 4 includes two process systems, P5.1 and P5.2. At least one of the process systems P5.1 and P5.2 performs at least one operation upon the product received via the second conveyor system CS2 and outputs the product to a third conveyor system CS3. The third conveyor system CS3 is configured to transport the product from the fifth process P5 to a second transport station TS2. The second transport station TS2 is configured to operate the same as the transport station TS2, and includes zones Z4, Z5, and Z6, robots R4A, R4B, R5A, R5B, R6A, and R6B, and a track T. The second transport station TS2 provides at least a portion of the product to the ninth process system P9. The ninth process P9 of FIG. 4 includes three process systems, P9.1, P9.2, and P9.3. The ninth process P9 is configured to receive the product and to perform at least one operation on at least a portion of the product. A production process may conclude at the process P9, for example, where the process P9 is a book covering process or a distribution processing station.

The implementation illustrated by FIG. 4 includes a production system separated via two transport stations, TS and TS2 for space saving measurements. The first conveyor CS1 is configured to provide output from processing systems P1.1-P1.4 with the capability to route products to the correct zone of the transport station TS. The second conveyor system CS2 and/or third conveyor system CS3 may similarly be capable of routing products to the correct zone of the transport station TS2. As such, manufacturing and distribution sections of the system 400 may be separated. Each of the processes P1.1, P1.2, P1.3, and P1.4 can deliver product to each zone (e.g., zones Z1-Z3) via the provided conveyor systems in the system 400. Although misplaced covers are no longer a concern in the system 400 (e.g., because of automated cover distribution configured to provide covers to the third process P3), control can still cause robots to move out of their respective zone depending on distances between pick-up and drop-off locations, similar to the problems described above with reference to FIGS. 2 and 3. As such, cross-feed issues still occur and cause losses in productivity in the system 400.

FIGS. 5-14 illustrate exemplary embodiments of decentralized systems which solve the above-noted issues with existing production systems. Implementations consistent with the present disclosure may include a buffer unit associated with one or more process units. Routing capabilities on the conveyor systems may be configured to route products only to available processes. As such, overall productivity of the system may be improved, and efficiency may be optimized by tracking available processes and pending process demand.

In one exemplary embodiment, production systems consistent with the present disclosure include printed document product production systems. However, it should be recognized by one having ordinary skill in the art that aspects of the present disclosure are not limited to only printing, but may be implemented in any production system having two or more processes associated therewith. One or more processes implemented in accordance with the present disclosure may include at least a portion of one or more of a printing operation, a sorting operation, a collating operation, a jogging operation, a book covering operation, a page combining operation, a buffering operation, or any other operation capable of being performed upon or in association with at least a portion of a product, such as a printed product.

Figure 5:
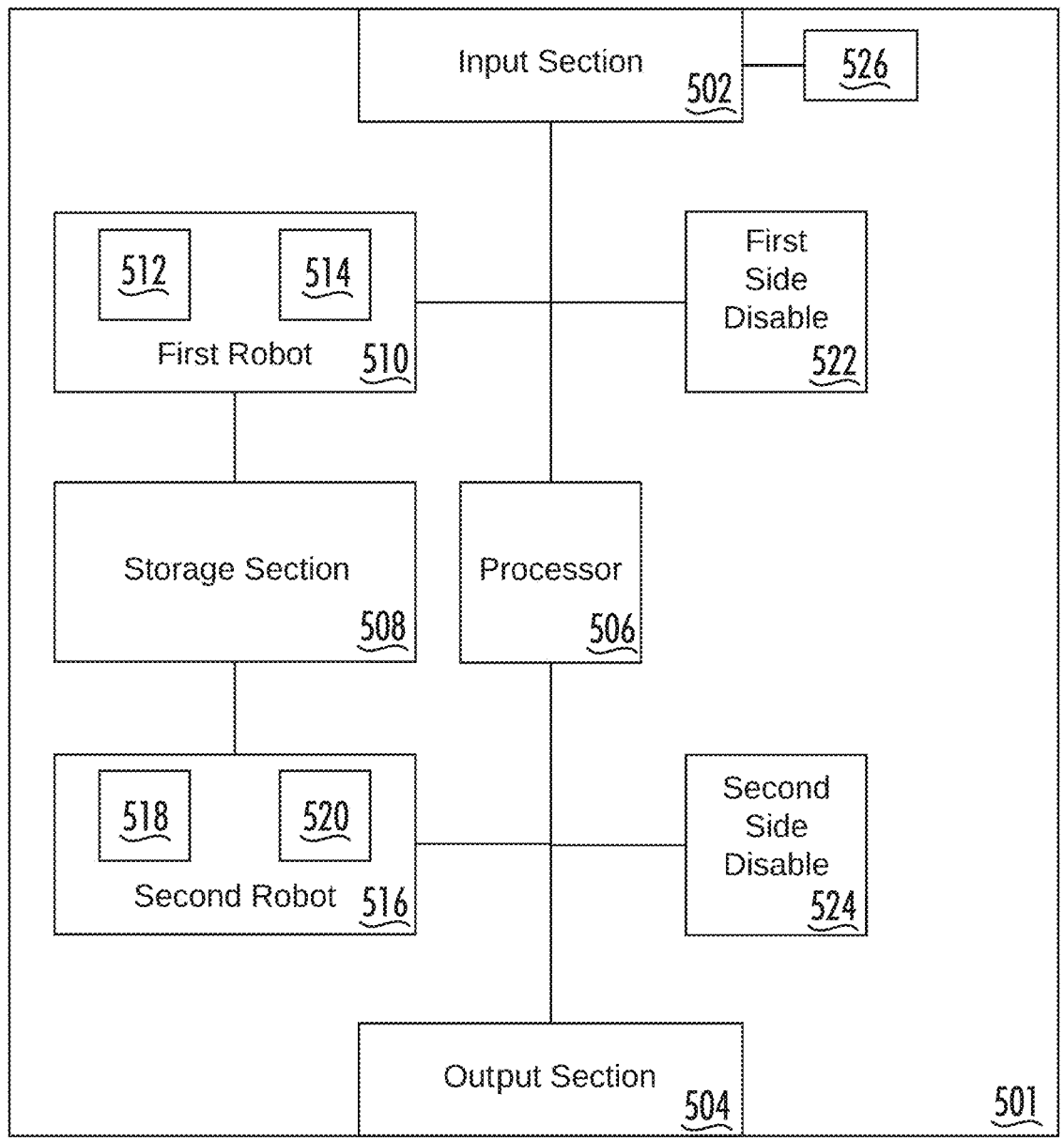
FIG. 5 illustrates a block diagram of an exemplary embodiment of a buffer according various aspects of the present disclosure.

FIG. 5 illustrates a block diagram of an exemplary embodiment of a buffer 500 according various aspects of the present disclosure. The buffer 500 includes at least one of an enclosure 501, an input section 502, an output section 504, a storage section 508, a first robot 510, a first gripper 512, a first circuit 514, a second robot 516, a second gripper 518, a second circuit 520, a first side disable mechanism 522, a second side disable mechanism 524, and/or a visual indicia processor 526. The buffer 500 includes at least one of an input section 502 and an output section 504. In one exemplary embodiment, each of the input section 502 and the output section 504 are configured to input and/or output at least a portion of a product. Each of the input section 502 and the output section 504 may transmit or receive at least a portion of a product to or from a conveyor, a process, a process system, or any other element associated with a production system. The input section 502 may include or otherwise be associated with or coupled to a visual indicia processor 526. The visual indicia processor 526 may be configured to obtain one or more sets of visual data corresponding to at least a portion of a product and/or one or more parameters associated with the at least a portion of the product. In one exemplary embodiment, the visual indicia processor 526 is configured to obtain a unique identifier associated with the at least a portion of the product by obtaining a photograph or other optical identification, scan, or measurement associated with the at least a portion of the product. Additionally or alternatively, one or more parameters associated with the at least a portion of the product may be obtained at least in part using the visual indicia processor 526.

Although described with reference to visual indicia, it should be appreciated that any form of perceptible indicia may be obtained either directly from or in association with at least a part of a product, without departing from the spirit and the scope of the present disclosure. For example, a radio frequency (RF) identifier associated with the at least a portion of the product may be obtained, a Quick Response (QR) code associated with the at least a portion of the product may be obtained, a bar code may be scanned or identified, or any other form of data and/or metadata associated with the at least a portion of the product may be obtained either from the at least a portion of the product or in association with an aspect of the at least a portion of the product. In various embodiments, at least one process may include printing an antenna on at least a portion of a product and coupling at least one electronic device to provide an identifier or parameter associated with the at least a portion of the product.

Each of the input section 502 and the output section 504 may be coupled to a processor 506. The processor 506 may be configured to control one or more operations associated with the buffer 500, including one or more operations of or associated with at least one of the input section 502, the output section 504, the storage section 508, the first robot 510, the first gripper 512, the first circuit 514, the second robot 516, the second gripper 518, the second circuit 520, the first side disable mechanism 522, the second side disable mechanism 524, and/or the visual indicia processor 526. In various embodiments, systems consistent with the present disclosure may include a plurality of buffers 500. In such configurations, each processor 506 of each buffer 500 may be configured to control one or more operations of any locally or remotely-located component of any buffer 500. Additionally or alternatively, at least one processor 506 may be located remotely from one or more buffer 500. In one exemplary embodiment, one or more operations associated with a buffer 500 may be controlled by a remote source, such as another buffer 500 or a control server (not illustrated). Remote control and/or commands may be transmitted and/or received via one or more wired or wireless communications connections associated with at least one processor 506, where the one or more wireless communications connections are configured to be communicated via one or more public and/or private networks.

A first robot 510 may be coupled to the processor 506. The first robot 510 may include a first gripper 512 and a first circuit 514. The first gripper 512 may be an electromechanical device configured to convey at least a portion of a product within the buffer 500. Additional description relating to the first gripper 512 may be found below, as described with reference to FIG. 9. The first gripper 512 may be associated with at least one of the input section 502 and the output section 504 in various embodiments. In one exemplary embodiment, the first gripper 512 is configured to convey at least a portion of a product received by the buffer 500 at the input section 502 and to transport the at least a portion of the product to and from the storage section 508 of the buffer 500. Unlike existing systems, a configuration of the storage section 508 may be configured in a vertical (e.g., stacked, multi-layer) manner rather than a horizontal (e.g., single-layer) manner. The illustrated storage configuration further provides a compressed design which is configurable and/or expandable. Doing so enables significantly increasing storage capacity of a buffer 500. Additionally, inventions consistent with the present disclosure may include at least one of predetermined storage locations for products or portions thereof, or may additionally or alternatively comprise storage learning and/or tracking algorithms configured to efficiently store and retrieve products and portions thereof with respect to the storage section 508. For example, one algorithm may be used to identify or scan at least a portion of the storage section 508 by at least one component of the buffer 500 to determine one or more storage spaces and/or configurations for use by the buffer 500.

The first gripper 512 is configured to be moved and/or controlled via the first circuit 514. The first circuit 514 includes one or more motive elements configured to transport or otherwise manipulate a position, location, speed of movement, relative angle, or any other parameter associated with a physical location and/or orientation of the first gripper 512. Additional information relating to the first circuit 514 and its relationship with the first gripper 512 may be found herein, as described with reference to FIGS. 8 and 9.

A second robot 516 may be coupled to the processor 506. The second robot 516 may include a second gripper 518 and a second circuit 520. The second gripper 518 may be an electromechanical device configured to convey at least a portion of a product within the buffer 500. Additional description relating to the second gripper 518 may be found below, as described with reference to FIG. 9. The second gripper 518 may be associated with at least one of the input section 502 and the output section 504 in various embodiments. In one exemplary embodiment, the second gripper 518 is configured to convey at least a portion of a product received by the buffer 500 at the input section 502 and to transport the at least a portion of the product to and from the storage section 508 of the buffer 500. The second gripper 518 is configured to be moved and/or controlled via the second circuit 520. The second circuit 520 includes one or more motive elements configured to transport or otherwise manipulate a position, location, speed of movement, relative angle, or any other parameter associated with a physical location and/or orientation of the second gripper 518. Additional information relating to the second circuit 520 and its relationship with the second gripper 518 may be found herein, as described with reference to FIGS. 8 and 9.

A first side disable mechanism 522 may be coupled to at least one of the processor 506 and the first robot 510. In one exemplary embodiment, the first side disable mechanism 522 is configured to disable operations of a first set of components of the buffer 500. For example, the first side disable mechanism 522 may be a moveable safety curtain at a first location of the buffer 500. At least one of the first circuit 514 and the processor 506 may be configured to generate and/or obtain an indication that the moveable safety curtain has moved or that a first portion of the buffer 500 should be disabled. Responsive to the indication, at least one of the first circuit 514 and the processor 506 may be configured to disable operation of at least a subset of components of the buffer 500. For example, in one embodiment, the indication may be configured to cause at least a portion of operations associated with the input section 502 and/or first robot 510 to at least temporarily cease operation. In various embodiments, the indication may be at least one of a mechanical signal and/or an electronic signal variously received from at least one component of the buffer 500.

Similar to the configuration of the first side disable mechanism 522, a second side disable mechanism 524 may be coupled to at least one of the processor 506 and the second robot 516. In one exemplary embodiment, the second side disable mechanism 524 is configured to disable operations of a second set of components of the buffer 500. For example, the second side disable mechanism 524 may be a moveable safety curtain at a first location of the buffer 500. At least one of the second circuit 520 and the processor 506 may be configured to generate and/or obtain an indication that the moveable safety curtain has moved or that a second portion of the buffer 500 should be disabled. Responsive to the indication, at least one of the second circuit 520 and the processor 506 may be configured to disable operation of at least a subset of components of the buffer 500. For example, in one embodiment, the indication may be configured to cause at least a portion of operations associated with the output section 502 and/or second robot 516 to at least temporarily cease operation. In various embodiments, the indication may be at least one of a mechanical signal and/or an electronic signal variously received from at least one component of the buffer 500.

During operation, when the indication is received relating to at least one of the first or second subsets of components of the buffer 500, at least one of the first circuit 514, the second circuit 520, and/or the processor 506 may be configured to cause at least a portion of the buffer 500 to continue operations despite the temporarily ceased operations of at least one subset of components of the buffer 500. For example, when one or more operations associated with the input section 502 are temporarily ceased, one or more components associated with the output section 504 may perform one or more operations previously performed by the one or more operations associated with the input section 502. For example, when the first robot 510 is performing at least one operation associated with the input section 502 and operation(s) of the first robot 510 are temporarily ceased, at least one component of the second robot 516 may be configured to perform at least one of the temporarily ceased operations of the first robot 510. This may include a situation where one of the first and second robots 510, 516 is temporarily ceased and the other of the first and second robots 510, 516 is configured to perform operations associated with the temporarily ceased robot. In various embodiments, each of the first and second robots 510, 516 is configured to perform any and/or all of the operations associated with the input section 502 and the output section 504.

In one embodiment, operations associated with one of the first and second robots 510, 516 may be temporarily ceased responsive to at least one mechanical and/or electrical indication signal as previously described. The non-ceased, other of the first and second robots 510, 516 may then perform the functions of the ceased, other robot. For example, a safety curtain at a first side of a buffer 500 may be closed, thereby causing a first side (and thereby, for example, the first robot 510) to be disabled. At least one of the first circuit 514, the second circuit 520, and/or the processor 506 may recognize that one of the first robot 510 and/or the second robot 516 is disabled, and may cause the other of the first robot 510 and/or the second robot 516 to perform one or more operations associated with the disabled robot or associated operation(s). Additionally or alternatively, the buffer 500 may be configured to determine and/or receive an indication of a single robot mode, whereby at least one of the first robot 510 and/or the second robot 516 may perform one or more operations associated with another of the first robot 510 and/or second robot 516. For example, in one exemplary embodiment, each of the first robot 510 and the second robot 516 are capable of performing one or more operations of another of the first robot 510 and/or second robot 516, including but not limited to all operations associated with another of the first robot 510 and/or second robot 516. Thus, in various embodiments, a single robot of the first robot 510 and second robot 516 may perform all operations associated with both the input section 502, the output section 504 and the storage section, without departing from the spirit and the scope of the present disclosure. In one exemplary embodiment, providing at least one safety curtain in the described manner may enable maintenance and/or repair while the buffer 500 is operational by isolating only one portion of the buffer 500 with the safety curtain.

Figure 6:
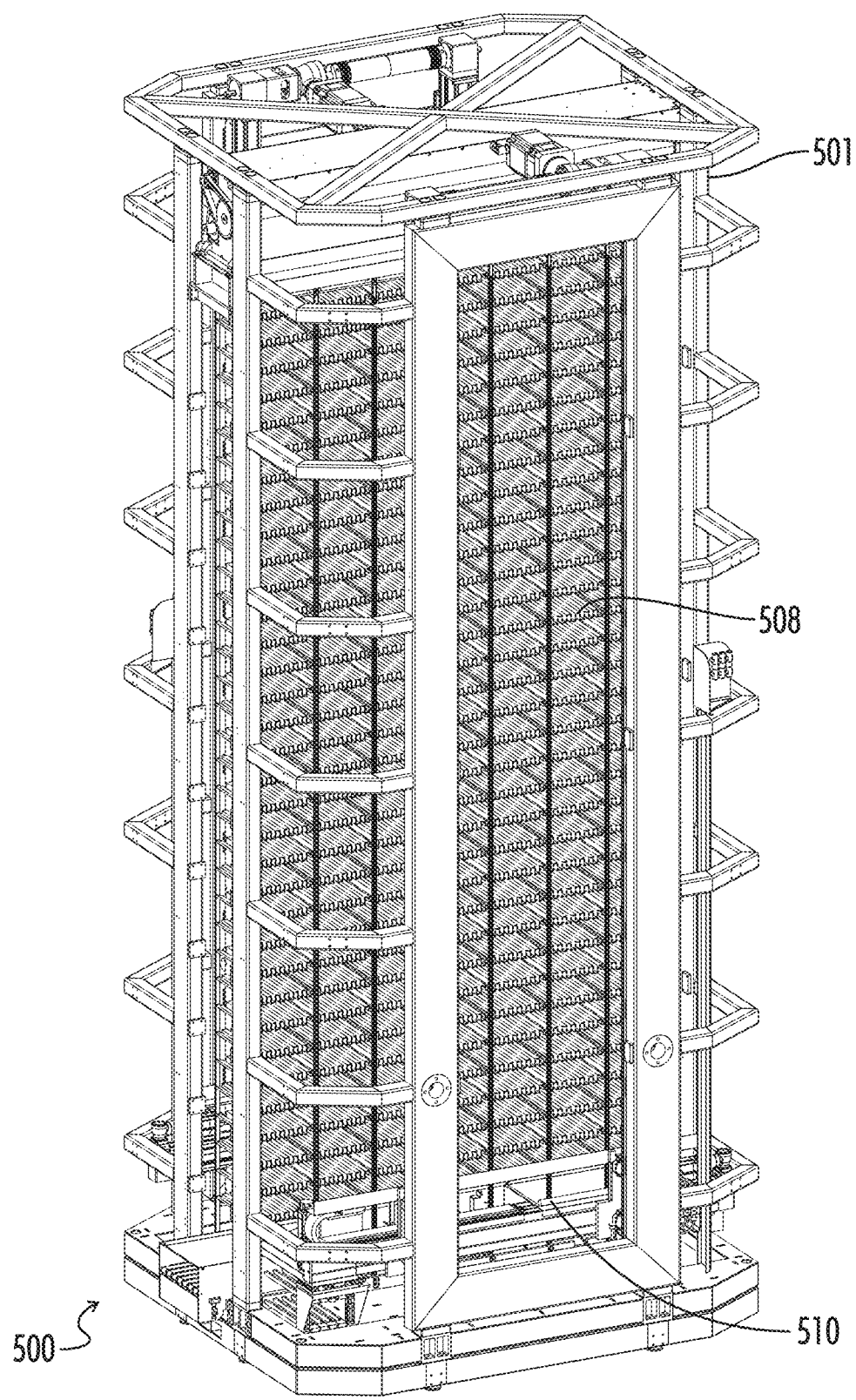
FIG. 6 illustrates a front, raised perspective view of an exemplary embodiment of a buffer according to various aspects of the present disclosure.

FIG. 6 illustrates a front, raised perspective view of an exemplary embodiment of a buffer 500 according to various aspects of the present disclosure. The buffer 500 may include the enclosure 501. In one embodiment, at least one of the size and/or a dimension of the buffer 500 may be selected according to a shipping size and/or a specific implementation requirement. For example, in one embodiment, a size of the buffer 500 may be 2.5 meters wide×2.3 meters deep×6 meters tall (e.g., as implemented relative to the size of a standard shipping container). A size, shape, and implementation orientation of the storage section 508 is illustrated in FIG. 6, although additional discussion is included herein below with reference to FIGS. 12 and 13. FIG. 6 illustrates the first robot 510 in an optional resting or initialization position at a base of the buffer 500. The buffer 500 or portions thereof may be configured so as to be moveable rather than static in nature. Furthermore, each buffer 500 may be configured to shipped as a complete unit, rather than requiring parts or portion to be assembled on-site.

Figure 7:
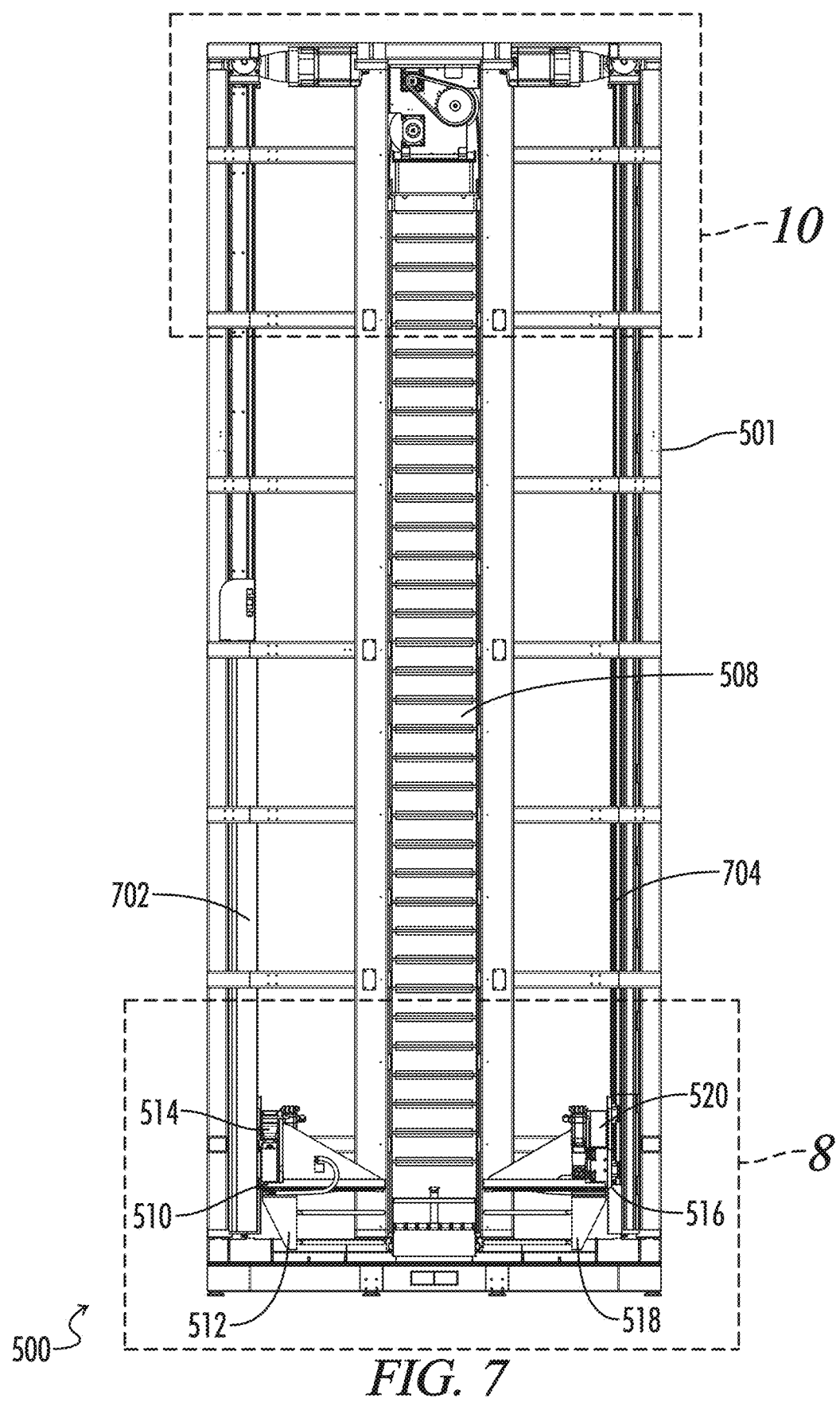
FIG. 7 provides a partial side view of an exemplary embodiment of a buffer according to aspects of the present disclosure.

FIG. 7 provides a partial side view of an exemplary embodiment of a buffer 500 according to aspects of the present disclosure. The buffer 500 includes the enclosure 501, the storage section 508, the first robot 510 (including the first gripper 512 and the first circuit 514), and the second robot 516 (including the second gripper 518 and the second circuit 520). FIG. 7 further illustrates a first track 702 associated with the first robot 510 and a second track 704 associated with the second robot 516. In one exemplary embodiment, at least one of the first robot 510 and the second robot 516 is configured to move in the longitudinal direction of the buffer 500 based, at least in part, upon a coupling between the first robot 510 and the first track 702, and/or the second robot 516 and the second track 704. An upper portion of the buffer 500 indicated via dashed lines is further illustrated by FIG. 10, as described herein. A lower portion of the buffer 500 indicated via dashed line sin FIG. 7 is further illustrated by FIG. 8, as described herein.

Figure 8:
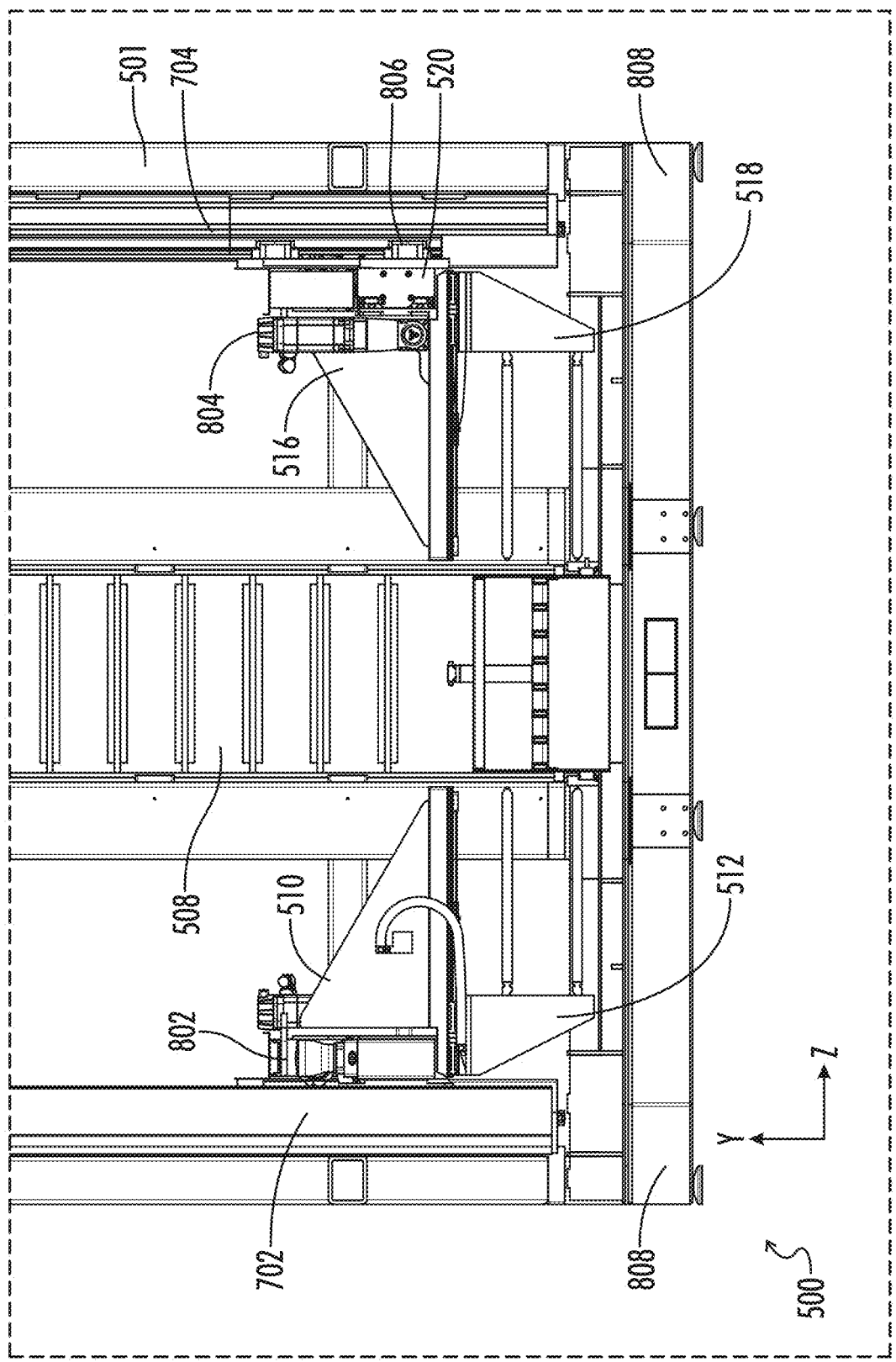
FIG. 8 illustrates a partial cutaway side view of a lower section of an exemplary embodiment of a buffer according to aspects of the present disclosure.

FIG. 8 illustrates a partial cutaway side view of a lower section of an exemplary embodiment of a buffer 500 according to aspects of the present disclosure. The buffer 500 illustrated in FIG. 8 includes the first robot 510 and the second robot 516, respectively coupled to the first track 702 and the second track 704 of the buffer 500. The first robot 510 includes the first gripper 512 and the first circuit 514, while the second robot 516 includes the second gripper 518 and the second circuit 520. The first robot 510 further includes a horizontal axis drive 802. The horizontal axis drive 802 is configured in various embodiments to control movement of the first gripper 512 in one or more directions. The second robot 516 may include a horizontal axis gripper 804 configured in various embodiments to enable movement of the second gripper 518 in one or more directions.

The second robot 516 optionally includes an arresting unit 806 coupled between the second robot 516 and the second track 704. In various embodiments, the arresting unit 806 is optionally configured to restrict and/or stop motion of the second robot 516 in a direction associated with the labeled Y-axis. Although not illustrated in FIG. 8, the first robot 510 may include an arresting unit 806 coupled between the first robot 510 and the first track 702, which may be configured to restrict and/or stop motion of the first robot 510 in a direction associated with the labeled Y-axis. The buffer 500 may further include one or more legs 808 coupled to an external surface of the enclosure 501. In one exemplary embodiment, the one or more legs 808 may include a ground plate which may be levelled before the buffer 500 is coupled thereto. The ground plate may be configured to be relatively easily positioned and/or fixed to a surface. The ground plate may be equipped with one or more couplers (e.g., bolts) configured to center the buffer 500 on the ground plate for better accuracy. In one embodiment, the ground plate is configured with one or more rollers permitting flexible relocation of the buffer 500 in case of configuration changes. The ground plate may be further configured to place the buffer 500 into a vertical orientation in various embodiments.

Figure 9:
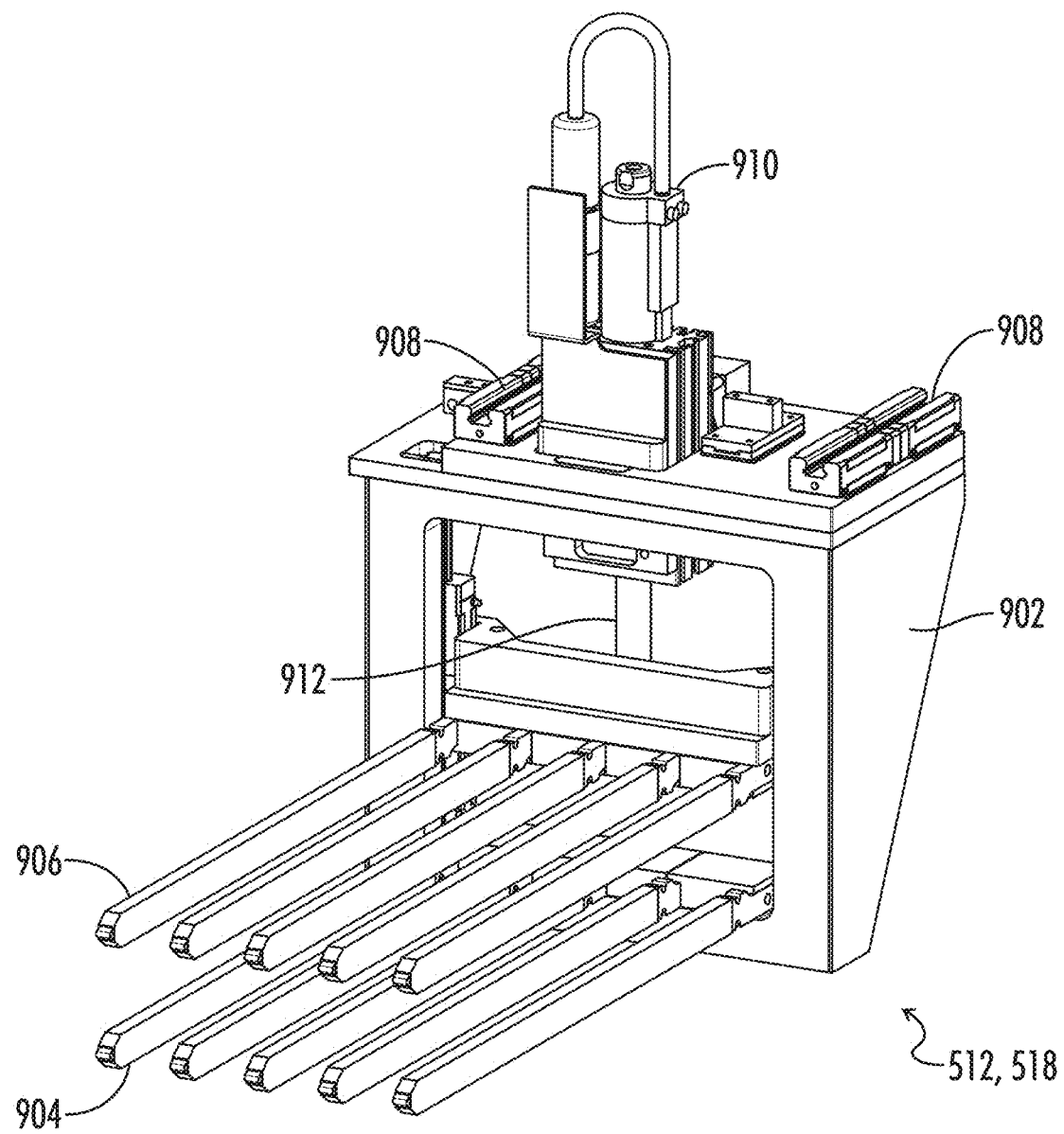
FIG. 9 illustrates a raised perspective view of an exemplary embodiment of a gripper according to aspects of the present disclosure.

FIG. 9 illustrates a raised perspective view of an exemplary embodiment of a gripper 512, 518 according to aspects of the present disclosure. The gripper 512, 518 includes a body 902. At least one lower grip sections 904 extends outwardly from the body 902. Although illustrated with 5 lower grip sections (e.g., formed as a single unit or implemented individually), it should be appreciated that each at least one lower grip section 904 may include a single section or a plurality of sections without departing from the spirit and the scope of the present disclosure. For example, although illustrated with five sections, each lower grip section 904 may include one section or any number of a plurality of lower grip sections 904.

The gripper 512, 518 may further include at least one upper grip section 906. Like the lower grip section 904, each upper grip section 906 may include a single section or a plurality of sections without departing from the spirit and the scope of the present disclosure. For example, although illustrated with five sections, each upper grip section 906 may include one section or any number of a plurality of upper grip sections 906. The upper grip section 906 may be at least partially coupled to the body 902 and/or may be moveably coupled to a movement portion 912 of a motor 910. In one exemplary embodiment, the motor 910 is a linear motor, although any motor or combination of motors may be used within the context of the present disclosure. The gripper 512, 518 may further include at least one connector 908. One or more of the at least one connector 908 may be configured to couple at least a portion of the gripper 512, 518 to at least a portion of the first or second circuit 510, 516, and/or to at least one component of the buffer 500. At least one connector 908 may be a coupler configured to couple to the buffer 500.

Figure 10:
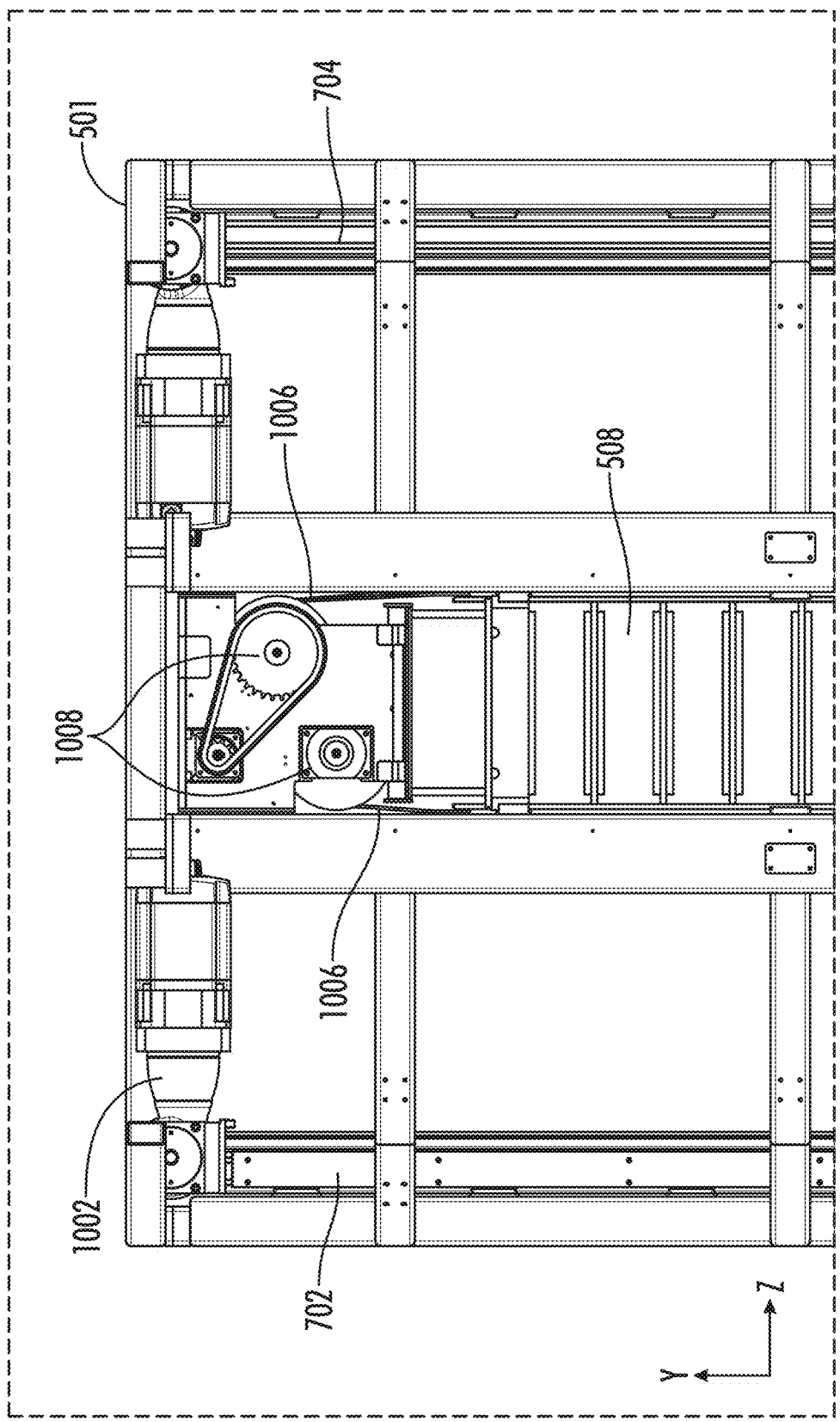
FIG. 10 illustrates a partial side view of an exemplary embodiment of a buffer according to various aspects of the present disclosure.

FIG. 10 illustrates a partial side view of an exemplary embodiment of a buffer 500 according to various aspects of the present disclosure. The buffer 500 of FIG. 10 includes the enclosure 501, the storage section 508, the first track 702, and the second track 704 as previously described herein. The buffer 500 includes a vertical axis drive 1002. The vertical axis drive 1002 may be configured to control movement of the first robot 510 in one or more directions associated with the labeled Y-axis. In one exemplary embodiment, the vertical axis drive 1002 is a motor configured to manipulate a position of the first robot 510 along the longitudinal direction of the buffer 500. The second robot 516 similarly is optionally coupled to a vertical axis drive 1004. The vertical axis drive 1004 may be configured to control movement of the second robot 516 in one or more directions associated with the labeled Y-axis. In one exemplary embodiment, the vertical axis drive 1004 is a motor configured to manipulate a position of the second robot 516 along the longitudinal direction of the buffer 500.

The buffer 500 may further include at least one curtain 1006. Each at least one curtain 1006 may be mechanically and/or electrically coupled to at least one of the first disable mechanism 522, the second disable mechanism 524, and/or the processor 506 and may be configured to operation in the manner described above with reference to FIG. 5. One or more curtain 1006 may be associated with a roller 1008 configured to retain at least a portion of the one or more curtain 1006, or to restrict movement thereof.

Figure 11:
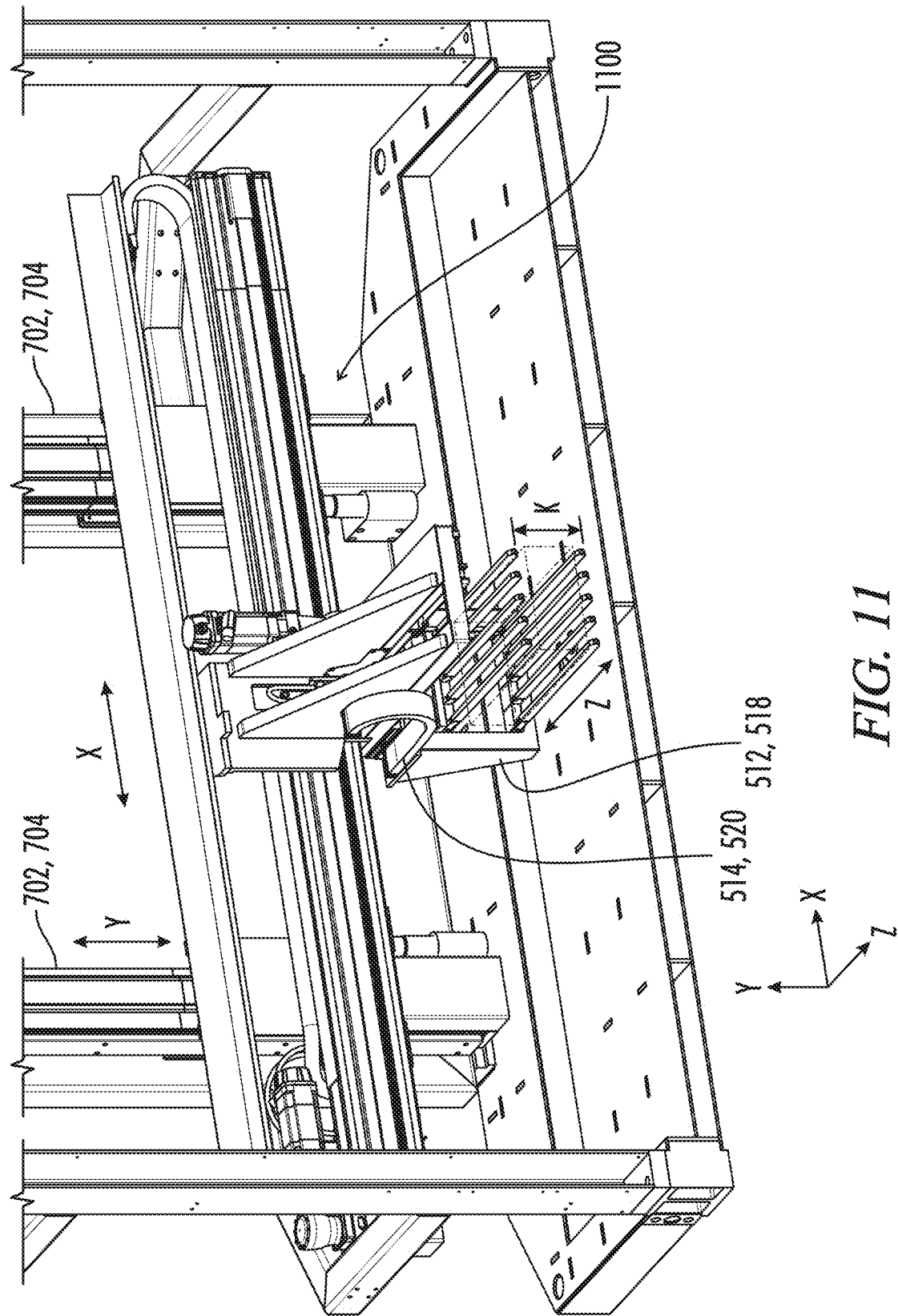
FIG. 11 illustrates a raised perspective view of an exemplary embodiment of a robot according to various aspects of the present disclosure.
Figure 12:
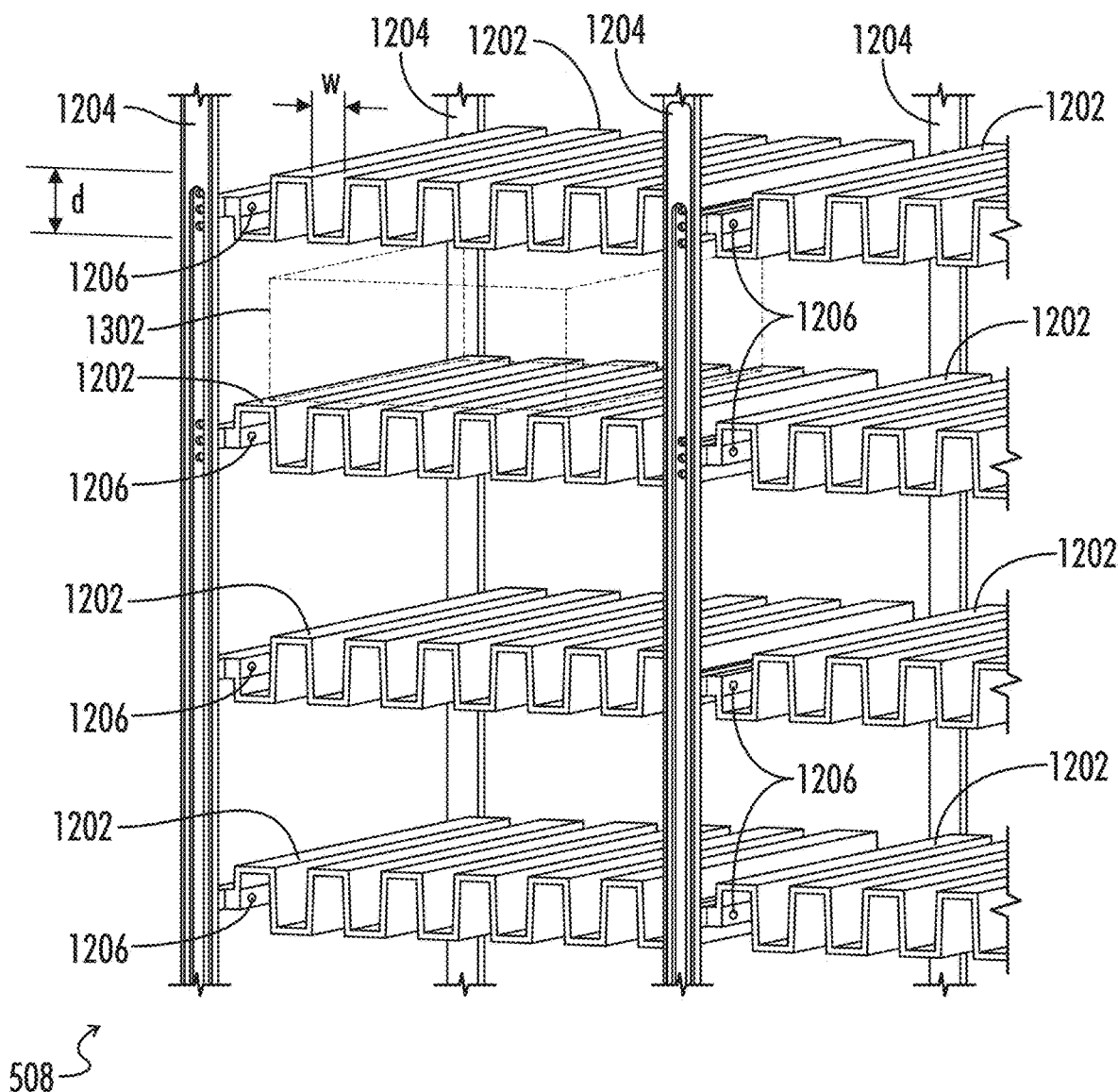
FIG. 12 illustrates a partial raised perspective view of an exemplary embodiment of the storage section according to aspects of the present disclosure.
Figure 13:
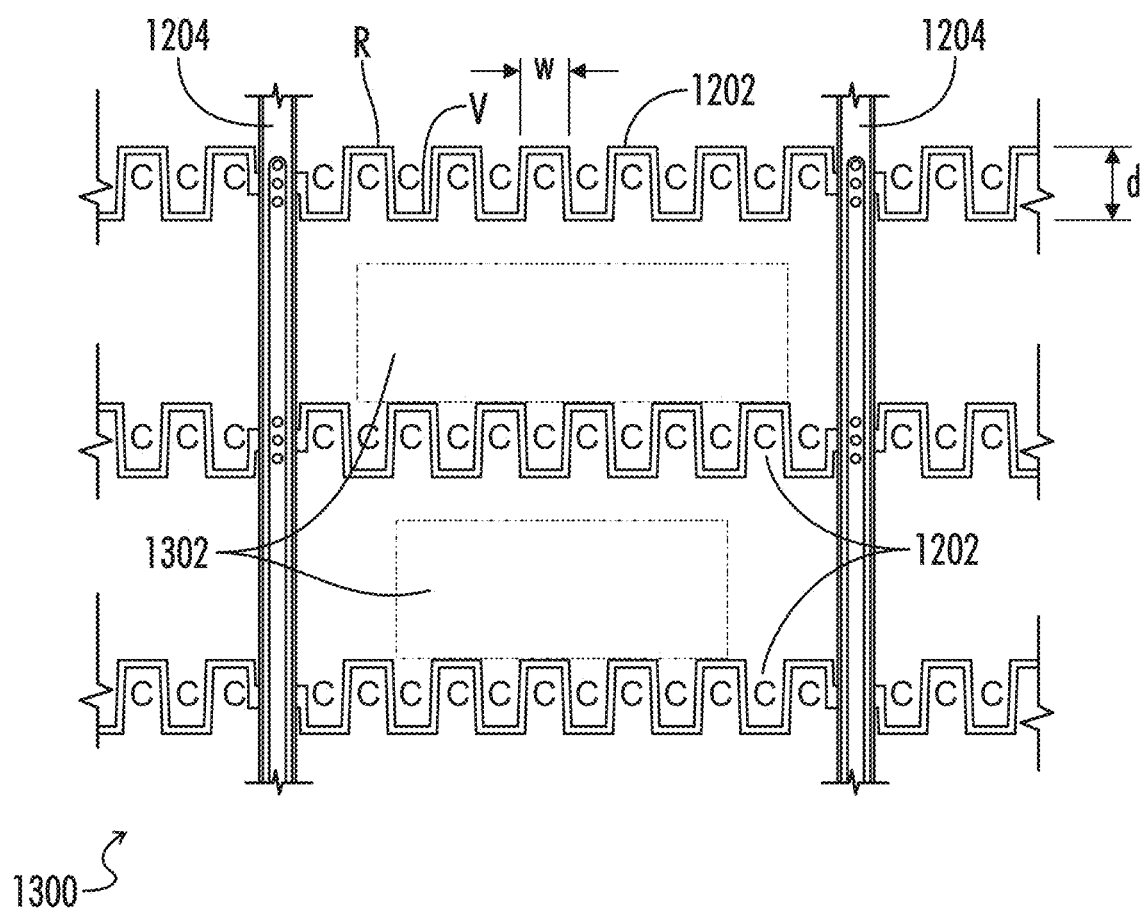
FIG. 13 illustrates a partial front view of a storage section of FIG. 12, according to various aspects of the present disclosure.

FIG. 11 illustrates a raised perspective view of an exemplary embodiment of a robot 1100 according to aspects of the present disclosure. The robot 1100 illustrated by FIG. 11 may be implemented in accordance with at least one of the first robot 510 and/or the second robot 516. As previously described, the robot 510, 516 may include at least one of a gripper 512, 518 and a circuit 514, 520. The circuit 514, 520 may be configured to cause the gripper 512, 518 to move in at least one vertical direction related to the labeled Y-axis of FIG. 11 (e.g., a longitudinal direction of the buffer 500), in at least one lateral direction related to the labeled X-axis of FIG. 11, and/or in at least one forward direction related to the labeled Z axis of FIG. 11. Each gripper 512, 518 may be configured to expand and/or close in accordance with a direction related to the labeled direction K, which may or may not be related to the labeled Y-axis.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

Referring generally to FIGS. 1-14, exemplary systems, apparatuses, and methods for providing print media assembly, buffering, and sorting are illustrated in greater detail. Where the various figures may describe embodiments sharing various common elements and features with other embodiments, similar elements and features are given the same reference numerals and redundant description thereof may be omitted below.

Figure 14:
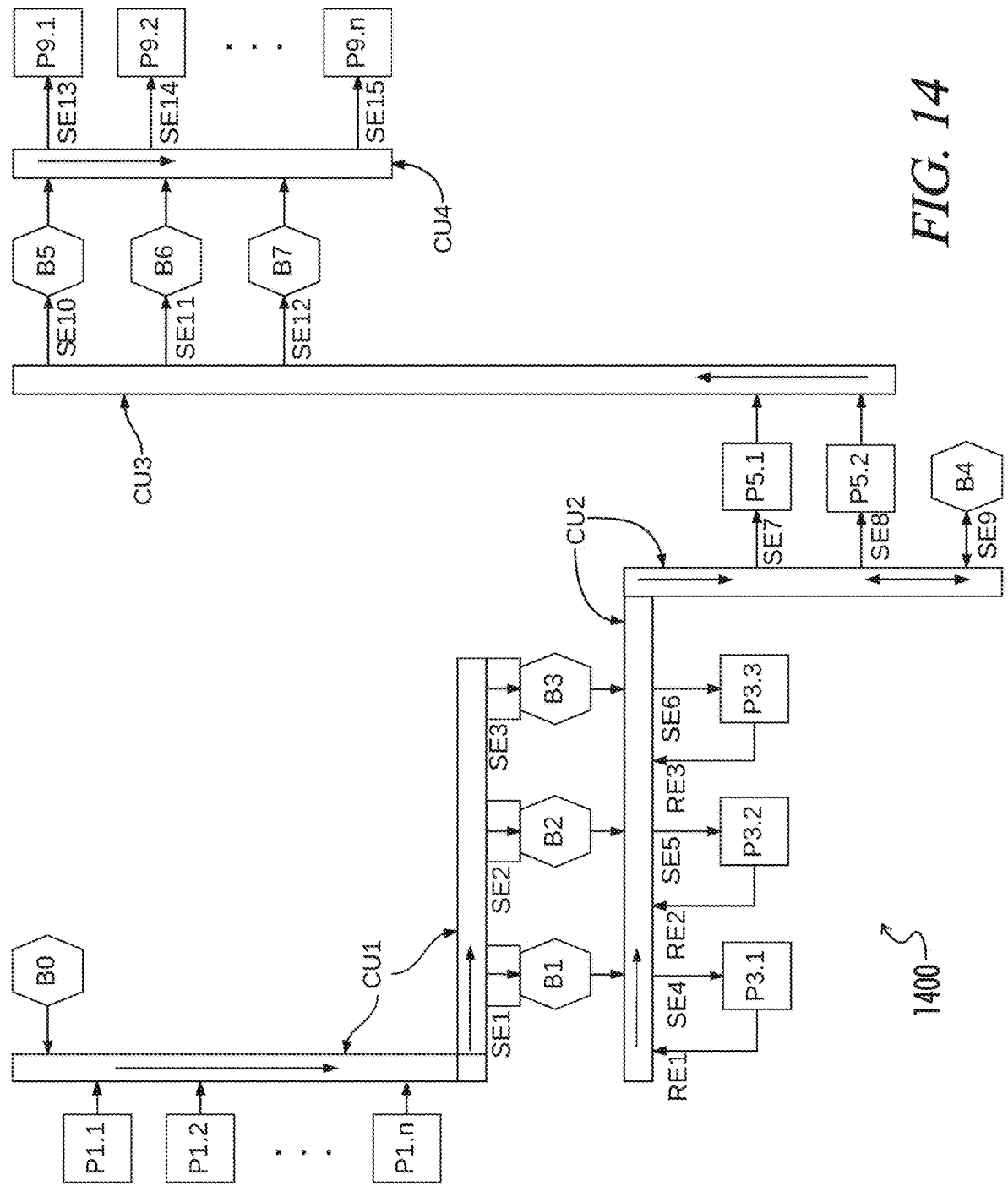
FIG. 14 illustrates an exemplary embodiment of a system for providing printed products using at least one unit for buffering and/or sorting, according to aspects of the present disclosure.

FIG. 14 illustrates an exemplary embodiment of a system 1400 for providing printed products using at least one unit for buffering and/or sorting, according to aspects of the present disclosure. The system 1400 includes a first process P1 configured to perform at least one operation on at least a portion of a product. The process P1 may include a plurality of process systems P1.1, P1.2, . . . , P1.n. One or more of the process systems P1.1., P1.2, . . . , P1.n may be coupled to a first conveyor unit CU1. Also coupled to the first conveyor unit CU1 may be at least one buffer B0. The at least one buffer B0 may be a buffer 500 as previously described herein. At least one of the first process P1, the buffer B0, and the first conveyor unit CU1 may be configured to receive at least a portion of a product to be operated upon in an exemplary embodiment. One or more elements of the first process P1 may be configured to receive the at least a portion of the product and to perform at least one operation on at least a portion of the product. After performing the at least one operation, at least one component of the first process P1 may be configured to transfer the at least a portion of the product to the first conveyor unit CU1. The first conveyor unit CU1 may be configured to transfer at least a portion of the product from at least one of the buffer B0 and/or the first process P1 to at least one of the buffers B1, B2, B3. One or more of the buffers B0-B7 illustrated in FIG. 14 may be configured to perform a sorting process in one exemplary embodiment. For example, one or more buffers may be configured to store at least a portion of the product, which may be combined, collated, or otherwise selectively combined or sorted by at least one buffer and/or other component of the system 1400.

At least a portion of the product may be optionally received by one or more of the buffers B1, B2, B3 based at least in part upon selectors SE1, SE2, SE3 respectively coupled to the buffers B1, B2, B3. Operation of the selectors SE1, SE2, SE3 may be controlled at least in part using at least one of a processor 506, a first circuit 514, and/or a second circuit 520 of at least one buffer 500, or may be locally or remotely controlled via one or more control signals generated by, received by, or otherwise accessible to the system 1400. Additionally or alternatively, as previously noted, one or more routing capabilities on the conveyor systems of the system 1400 may be configured to route products or portions thereof only to available processes. As such, overall productivity of the system may be improved, and efficiency may be optimized by tracking available processes and pending process demand.

Each of the buffers B1, B2, B3 may be configured to receive and/or store at least a portion of the product received from the first conveyor unit CU1. Each of the buffers B1, B2, B3 may be configured to store one or more portions of a product until a control signal or request is generated, received, or otherwise obtained by the respective buffer B1, B2, B3 during operation. In one exemplary embodiment, at least one of the buffers of the system 1400, and/or a local or remotely located control unit may be configured to monitor, track, and/or control operation of at least one product, portion of product, and/or element of the system 1400 during operation. For example, in one embodiment, a current utilization of each process and/or component may be tracked or measured. Similarly, a current status, load, and/or utilization of each buffer of the system 1400 may be tracked, monitored, and/or controlled. At least one operation associated with the system 1400 may be generated or performed based at least in part upon a parameter of at least one of a process and/or a buffer. In this exemplary embodiment, one or more products or portions of products stored at a buffer of system 1400 may be routed to a respective process based at least in part upon the parameter of the at least one process and/or buffer.

In one embodiment, a status of a product or portion thereof, as well as a parameter of a buffer of system 1400 may be tracked in accordance with at least one of an identifier or parameter associated with the product or portion thereof. During operation, a buffer of the system 1400 may be configured to determine at least one of an identifier and a parameter associated with a received product or portion thereof (e.g., by determining visual or other indicia as previously described). At least one of the determined identifier and/or parameter may be used to selectively store and/or transmit a product or portion thereof within the system 1400 (e.g., between the various buffers and one or more processes or process systems thereof).

After performing at least one operation on at least a portion of the product, the corresponding buffer(s) B1, B2, B3, transmit(s) the product or portion thereof to the second conveyor unit CU2. The second conveyor unit CU2 is configured to selectively transmit the product or portion thereof to at least one of the process P3, the process P5, and/or the buffer B4. If it is determined that the product or at least a portion thereof is to be processed by the third process P3, the corresponding product or portion thereof is transmitted to at least one determined process system P3.1, P3.2, P3.3 via a respective selection path SE4, SE5, SE6. Although illustrated with reference to three process systems P3.1, P3.2, P3.3, it should be appreciated that the third process P3 may have any number of corresponding process systems without departing from the spirit and the scope of the present disclosure. After performing one or more operations on the product or portion thereof, at least one of the process systems P3.1, P3.2, and/or P3.3 transmits the product or at least a portion thereof to the second conveyor unit CU2 via at least one corresponding return path RE1, RE2, RE3.

The second conveyor unit CU2 continues to a fifth process P5. If it is determined that the product or at least a portion thereof is to be processed by the fifth process P5, the corresponding product or portion thereof is transmitted to at least one determined process system P5.1 or P5.2 via a respective selection path SE4 or SE5. Although illustrated with reference to two process systems P5.1 and P5.2, it should be appreciated that the fifth process P5 may have any number of corresponding process systems without departing from the spirit and the scope of the present disclosure. After performing one or more operations on the product or portion thereof, at least one of the process systems P5.1 and/or P5.2 transmits the product or at least a portion thereof to the third conveyor unit CU3.

Also coupled to the second conveyor unit CU2 is at least one buffer B4. Control of the second conveyor unit CU2 may be such that the conveyor unit CU2 may operate in a bi-directional manner, at least with respect to the buffer B4 and the process system P5.2. As such, at least one of a product or portion thereof may be stored by the buffer B4 and/or transmitted by the buffer B4 to the second conveyor unit CU2 during operation in the manner described herein.

The third conveyor unit CU3 may be coupled to one or more of buffers B5, B6, B7. In one embodiment, a status of a product or portion thereof, as well as a parameter of a buffer of system 1400 may be tracked in accordance with at least one of an identifier or parameter associated with the product or portion thereof by at least one of the buffers B5, B6, B7. As noted above, during operation a buffer of the system 1400 may be configured to determine at least one of an identifier and/or a parameter associated with a received product or portion thereof (e.g., by determining visual or other indicia as previously described). At least one of the determined identifier and/or parameter may be used to selectively store and/or transmit a product or portion thereof within the system 1400 (e.g., between the various buffers and one or more processes or process systems thereof).

After performing at least one store and/or transmit operation on at least a portion of the product, the corresponding buffer(s) B5, B6, B7, transmits the product or portion thereof to the fourth conveyor unit CU4. The fourth conveyor unit CU4 is configured to selectively transmit the product or portion thereof to at the ninth process P9 (i.e., to at least one of process systems P9.1, P9.2, . . . , P9.n). If it is determined that the product or at least a portion thereof is to be processed by the ninth process P9, the corresponding product or portion thereof is transmitted to at least one determined process system P9.1, P9.2, P9.n via a respective selection path SE10, SE11, SE12. A production process may conclude at the process P9, for example, where the process P9 is a book covering process or a distribution processing station.

In various embodiments consistent with the present disclosure, a process or process system as described herein may be configured to perform at least one operation, including: a printing operation, a sorting operation, a collating operation, a jogging operation, a book covering operation, a page combining operation, or any other processing operation for a printed material and/or product, or any operation capable of being performed during a production process.

Although described with reference to print media, one or more aspects of the present disclosure may be implemented for non-print media and/or combined print and non-print media embodiments. For example, a buffer 500 consistent with the present disclosure may be capable of receiving a tray filled with one or more goods for fulfillment and/or one or more good may be directly placed within the buffer 500. As such, one or more heights or distances between shelved or a total height of a buffer 500 may be configured to receive one or more goods or containers of goods for a particular order, and in one embodiment may be stored until ready to be shipped, delivered, or fulfilled.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims. The phrase "in one embodiment," as used herein does not necessarily refer to the same embodiment, although it may.

The term "circuit" means at least either a single component or a multiplicity of components, either active and/or passive, that are coupled together to provide a desired function. Terms such as "wire," "wiring," "line," "signal," "conductor," and "bus" may be used to refer to any known structure, construction, arrangement, technique, method and/or process for physically transferring a signal from one point in a circuit to another. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A system for providing a multiple process workflow, the system comprising:
   a first process device configured to convey at least a portion of a printed element;
   an apparatus including:
      a storage section;
      an input section configured to receive the at least a portion of the printed element;
      a gripper configured to selectively transport the at least a portion of the printed element from the input section to the storage section and to selectively transport the at least a portion of the printed element from the storage section; and
      an output section configured to selectively transfer the at least a portion of the printed element from the storage section; and
   a second process device configured to perform at least one operation on the at least a portion of the printed element.

2. The system of claim 1, wherein the first process device is configured to perform at least one of a printing operation, a sorting operation, a collating operation, a jogging operation, a book covering operation, or a page combining operation.

3. The system of claim 1, wherein the second process device is configured to perform at least one of a printing operation, a sorting operation, a collating operation, a jogging operation, a book covering operation, or a page combining operation.

4. The system of claim 1, wherein the storage section of the apparatus comprises at least one segment having a plurality of ridges and valleys, the segment configured to store thereupon the at least a portion of the printed element.

5. The system of claim 1, wherein the input section comprises a visual indicia detector configured to identify at least one property associated with the at least a portion of the printed element.

6. The system of claim 1, wherein the apparatus further comprises a second gripper, the second gripper associated with at least one of the input section and the output section, the second gripper configured to perform at least one of:
   (i) selectively transporting the at least a portion of the printed element from the input section to the storage section,
   (ii) selectively transporting the at least a portion of the printed element from the storage section, and
   (iii) selectively transporting the at least a portion of the printed element to the output section.

7. The system of claim 6, wherein the gripper and the second gripper are configured to cooperatively operate to perform at least one of buffering and sorting.

8. The system of claim 6, wherein the gripper is configured to perform operations associated with the at least a portion of the printed element relating to the input section, and wherein the second gripper is configured to perform operations associated with the at least a portion of the printed element in relation to the output section.

9. The system of claim 1, wherein the apparatus further includes a processor configured to control at least one operation of the apparatus.

10. The system of claim 9, wherein the processor is configured to cause the gripper to selectively transport a media portion received at the input section to the storage section upon receipt of the media portion, and to selectively cause the gripper to transport the media portion to the output section based at least in part upon a control signal received at the processor.

11. A system for performing at least one of buffering or sorting a printed element, the system comprising:
- a first process device configured to convey at least a portion of a printed element;
- an apparatus, including:
  - a storage section including at least one segment having a plurality of ridges and valleys, the at least one segment configured to store the at least a portion of the printed element, and
  - a gripper configured to selectively transport the at least portion of the printed element to and from the storage section; and
  - an output section configured to selectively output the at least portion of the printed element; and
- a second process device configured to perform at least one operation in association with the at least a portion of the printed element.

12. The system of claim 11, wherein the first process device is configured to perform at least one of a printing operation, a sorting operation, a collating operation, a jogging operation, a book covering operation, or a page combining operation.

13. The system of claim 11, wherein the second process device is configured to perform at least one of a printing operation, a sorting operation, a collating operation, a jogging operation, a book covering operation, or a page combining operation.

14. The system of claim 11, wherein the storage section further comprises:
- a first storage portion and a second storage portion, each of the first storage portion and the second storage portion having a respective plurality of ridges and a respective plurality of valleys formed therein, the plurality of ridges and the plurality of valleys configured to form at least one cavity,
- wherein the plurality of ridges of the first storage portion and the second storage portion, and the plurality of valleys of the first storage portion and the second storage portion are configured such that at least a portion of the at least one gripper is received in the at least one cavity.

15. A system for performing at least one of buffering or sorting a printed element, the system comprising:
- a first process device configured to convey at least a portion of a printed element;
- a storage section including:
  - at least one gripper;
  - a plurality of ridges and a plurality of valleys configured to form at least one cavity, wherein the plurality of ridges and the plurality of valleys are configured such that at least a portion of the at least one gripper is received in the at least one cavity; and
  - an output section configured to selectively output the at least portion of the printed element; and
- a second process device having a second operation configuration, the second process device configured to perform at least one operation in association with the at least a portion of the printed element.

16. The system of claim 15, wherein the first process device is configured to perform at least one of a printing operation, a sorting operation, a collating operation, a jogging operation, a book covering operation, or a page combining operation.

17. The system of claim 15, wherein the second process device is configured to perform at least one of a printing operation, a sorting operation, a collating operation, a jogging operation, a book covering operation, or a page combining operation.

* * * * *